(12) United States Patent
Werdehausen et al.

(10) Patent No.: US 11,656,432 B2
(45) Date of Patent: May 23, 2023

(54) COMPACT TELEPHOTO LENS HAVING MATERIALS WITH ANOMALOUS RELATIVE PARTIAL DISPERSION

(71) Applicant: Carl Zeiss AG, Oberkochen (DE)

(72) Inventors: Friedrich Daniel Werdehausen, Herbrechtingen (DE); Hans-Juergen Dobschal, Bad Sulza (DE); Markus Seesselberg, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/672,266

(22) Filed: Feb. 15, 2022

(65) Prior Publication Data
US 2022/0260808 A1 Aug. 18, 2022

(30) Foreign Application Priority Data
Feb. 16, 2021 (DE) .......................... 102021103587.2

(51) Int. Cl.
| | | |
|---|---|---|
| *H04N 5/225* | (2006.01) | |
| *G02B 13/00* | (2006.01) | |
| *G02B 15/00* | (2006.01) | |
| *G02B 13/02* | (2006.01) | |

(52) U.S. Cl.
CPC ........... *G02B 13/002* (2013.01); *G02B 13/02* (2013.01); *G02B 15/00* (2013.01); *H04N 5/2254* (2013.01)

(58) Field of Classification Search
CPC ...... G02B 13/00; G02B 13/02; G02B 13/002; G02B 15/00; H04N 5/225; H04N 5/2254
USPC ........................................................ 348/649
See application file for complete search history.

(56) References Cited

U.S. PATENT DOCUMENTS

| | | | |
|---|---|---|---|
| 6,101,035 A | 8/2000 | Maruyama | |
| 6,912,092 B2 | 6/2005 | Ukuda | |
| 7,136,237 B2 | 11/2006 | Ogawa | |
| 7,158,320 B2 | 1/2007 | Nishio | |
| 7,193,789 B2 | 3/2007 | Maetaki | |

(Continued)

FOREIGN PATENT DOCUMENTS

| | | |
|---|---|---|
| CN | 1782773 A | 6/2006 |
| CN | 102043230 A | 5/2011 |

(Continued)

OTHER PUBLICATIONS

H. J. Bruckner, V. Blahnik, and U. Teubner, "Maximale Bildqualitat aus Minikameras," Physik in unserer Zeit 51, 236-243 (2020), May 2020; 16 pages.

(Continued)

*Primary Examiner* — Trang U Tran
(74) *Attorney, Agent, or Firm* — Skaar Ulbrich Macari, P.A.

(57) ABSTRACT

A lens for a camera has a longitudinal axis, a focal length, an installation length in the direction of the longitudinal axis of less than 10 mm, a plurality of refractive optical elements and a stop with a maximum diameter. The focal length of the lens can be in the range of 25 mm to 6 mm, and the ratio of focal length to maximum diameter of the stop can be in the range of 1.4 to 8. At least one refractive optical element can be formed of a material with an Abbe number for which the absolute value of the difference between relative partial dispersion of the material and a normal relative partial dispersion at the Abbe number of the material is at least 0.05.

15 Claims, 4 Drawing Sheets

(56) References Cited

U.S. PATENT DOCUMENTS

| | | | |
|---|---|---|---|
| 7,292,398 | B1 | 11/2007 | Misaka |
| 7,312,935 | B2 | 12/2007 | Kobayashi |
| 7,800,842 | B2 | 9/2010 | Iba et al. |
| 8,773,783 | B2 | 7/2014 | Maetaki |
| 8,934,183 | B2 | 1/2015 | Maetaki |
| 9,223,118 | B2 | 12/2015 | Mercado |
| 9,507,125 | B2* | 11/2016 | Hashimoto ............... G02B 9/64 |
| 9,541,730 | B2* | 1/2017 | Kubota ............... G02B 13/0045 |
| 9,632,287 | B2* | 4/2017 | Chae ......................... G02B 9/64 |
| 9,703,078 | B1* | 7/2017 | Teraoka ............ G02B 13/0045 |
| 10,001,623 | B2* | 6/2018 | Park .................... G02B 13/0045 |
| 10,133,032 | B2* | 11/2018 | Gong ........................ G02B 9/64 |
| 10,168,509 | B2* | 1/2019 | Teraoka ............ G02B 27/0025 |
| 10,261,288 | B2 | 4/2019 | Jang et al. |
| 10,288,845 | B2 | 5/2019 | Chen et al. |
| 10,306,031 | B2 | 5/2019 | Tseng et al. |
| 10,451,845 | B2* | 10/2019 | Yan .......................... G02B 9/64 |
| 10,495,849 | B2* | 12/2019 | Shin ..................... G02B 13/004 |
| 10,942,336 | B2* | 3/2021 | Yang ................. G02B 13/0045 |
| 2009/0185283 | A1 | 7/2009 | Maetaki |
| 2018/0074297 | A1 | 3/2018 | Samsung |
| 2019/0049700 | A1* | 2/2019 | Kunimatsu ........ G02B 27/0025 |
| 2019/0056570 | A1 | 2/2019 | Yeh et al. |

FOREIGN PATENT DOCUMENTS

| | | |
|---|---|---|
| CN | 206946086 U | 1/2018 |
| CN | 109143551 A | 1/2019 |
| CN | 110187469 A | 8/2019 |
| CN | 110618517 A | 12/2019 |
| CN | 212540856 U | 2/2021 |

OTHER PUBLICATIONS

Schott AG, "Optical Glass 2018" https://www.schott.com/d/advanced_optics/c36214d9-13c4-468c-of40-8d438b89f532/1.14/schott-optical-glass-pocket-catalog-jan-2018-row.pdf; 2018; 150 pages.

P. Hartmann, "Optical glass: deviation of relative partial dispersion from the normal line-need for a common definition," Optical Engineering 54, 105112 (2015); Oct. 2015; 9 pages.

D. Werdehausen, S. Burger, I Staude, T. Pertsch, and M. Decker, "Dispersion-engineered nanocomposites enable achromatic diffractive optical elements," Optica 6, 1031 (2019); Aug. 7, 2019; 8 pages.

D. Werdehausen, S. Burger, I Staude, T. Pertsch, and M. Decker, "General design formalism for highly efficient flat optics for broadband applications," Optics Express 28, 6452 (2020); Feb. 19, 2020; 17 pages.

J.-g. Liu, and M. Ueda, "High refractive index polymers: fundamental research and practical applications," J. Mater. Chem. A 19, 8907-8919 (2009); Aug. 6, 2009; 14 pages.

D. Werdehausen, I. Staude, S. Burger, J. Petschulat, T. Scharf, T. Pertsch, and M. Decker, "Design rules for customizable optical materials based on nanocomposites," Opt. Mater. Express 8, 3456 (2018); Oct. 19, 2018; 14 pages.

D. Werdehausen, X. G. Santiago, S. Burger, I. Staude, T. Pertsch, C. Rockstuhl, and M. Decker, "Modeling Optical Materials at the Single Scatterer Level: The Transition from Homogeneous to Heterogeneous Materials," Advanced Theory and Simulations n/a, 2000192 (2020); Sep. 13, 2020; 12 pages.

T. Steinich, and V. Blahnik, "Optical design of camera optics for mobile phones", Advanced Optical Technologies 1 (2012); 8 pages.

M. Kreitzer, and J. Moskovich, "Optical design of a smartphone zoom lens", Proc. SPIE 11106, Zoom Lenses VI, 111060D, Sep. 9, 2019, 14 pages.

* cited by examiner

COMPACT TELEPHOTO LENS HAVING MATERIALS WITH ANOMALOUS RELATIVE PARTIAL DISPERSION

PRIORITY

This application claims the benefit of German Patent Application No. 10 2021 103 587.2, filed Feb. 16, 2021, which is hereby incorporated herein by reference in its entirety.

FIELD

The present invention relates to a lens for a camera, a camera and a mobile device, for example a smartphone.

BACKGROUND

Numerous mobile devices, in particular smartphones, typically have a camera. Here, it is predominantly a high-quality camera that is desired. Moreover, there is a need for cameras with a zoom range that is as large as possible. However, there are significant restrictions on the installation length (TL) of smartphone lenses. However, at the same time there is a need for systems with long focal lengths (f) in order to be able to cover a greater zoom range with different camera modules. However, the increase in the focal length for an unchanged installation length which is required to this end, in particular the realization of focal lengths greater than the installation length, is difficult. Inter alia, this is due to the low refractive indices of polymers from which the utilized lens elements are typically produced. By way of example, examples of lenses with focal lengths of the order of installation length are described in documents U.S. Pat. Nos. 9,223,118 B2, 10,306,031 B2, 10,288,845 B2, 10,261,288 B2, 6,101,035 A, 7,800,842 B2 and US 2019/0056570 A1, and in H. J. Brückner, V. Blahnik, and U. Teubner, "Maximale Bildqualität aus Minikameras" [Maximum image quality from miniature cameras], Physik in unserer Zeit 51, 236-243 (2020).

The dispersion properties of optical materials are conventionally described by their Abbe number $v_d$ and relative partial dispersion $P_{g,F}$. The Abbe number is a dimensionless quantity which describes the dispersive properties of an optical material. The following definition of the Abbe number is used below:

$$v_d = \frac{n_d - 1}{n_F - n_C},$$

where the subscript "d" means that the d line of helium has been used for the definition of the Abbe number. In this definition, $n_d$ represents the refractive index at the wavelength of the d line of helium (587.56 nm), $n_F$ represents the refractive index at the wavelength of the F line of hydrogen (486.13 nm) and $n_C$ represents the refractive index at the wavelength of the C line of hydrogen (656.27 nm). [Also see Schott AG, "Optical Glass 2018" https://www.schott.com/d/advanced_optics/c36214d9-13c4-468c-bf40-8d438b89f-532/1.14/schott-optical-glass-pocket-catalog-jan-2018-row.pdf.]

However, other definitions of the Abbe number to $v_d$ may also be used within the scope of the present invention, for example $v_e$. However, this requires an adjustment of the specific values and limits specified below. In the case of $v_e$, the refractive index $n_e$ at the wavelength of the e line of mercury (546.07 nm) is used in the equation above instead of the refractive index $n_d$ at the wavelength of the d line of helium, the refractive index $n_{F'}$ at the wavelength of the F' line of cadmium (479.99 nm) is used instead of the refractive index $n_F$ at the wavelength of the F line of hydrogen, and the refractive index $n_{C'}$ at the wavelength of the C' line of cadmium (643.85 nm) is used instead of the refractive index $n_C$ at the wavelength of the C line of hydrogen.

Relative partial dispersion describes a difference between the refractive indices of two specific wavelengths in relation to a reference wavelength interval and represents a measure for the relative strength of the dispersion between these two wavelengths in the spectral range. In the present case, the two wavelengths are the wavelength of the g line of mercury (435.83 nm) and the wavelength of the F line of hydrogen (486.13 nm), and so $$P_{g,F} = \frac{n_g - n_F}{n_F - n_C}$$

gives the relative partial dispersion $P_{g,F}$, where $n_F$ and $n_C$ are the same as in the case of $v_d$. A different definition can also be used for the relative partial dispersion, in which the F and C lines of hydrogen are replaced by the F' and C' lines of cadmium, for example. The values and limits specified below must be adapted accordingly.

Figure 1:
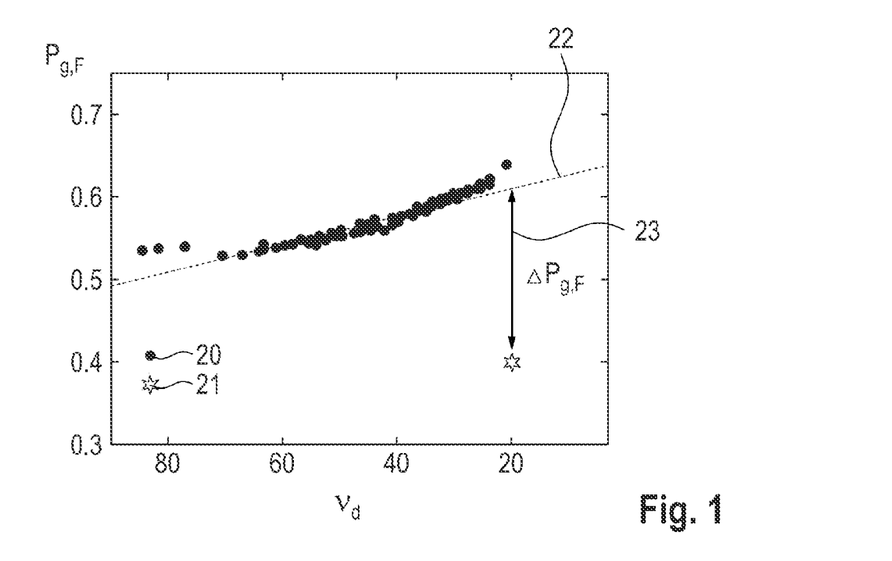
FIG. 1 schematically shows, in the form of a diagram, the dependence of the relative partial dispersion $P_{g,F}$ of known optical glasses on the Abbe number.

In general, there is an approximately linear relationship between the relative partial dispersion $P_{g,F}$ and the Abbe number $v_d$ in the case of conventional optical glasses. In this context, the line which approximately reproduces this general relationship is referred to as the so-called normal line for optical glasses. Historically, the line which connects the values of the K7 and F2 type Schott glasses is defined as the normal line. FIG. 1, described below, elucidates this. Usually, the following definition, taken from P. Hartmann, "Optical glass: deviation of relative partial dispersion from the normal line—need for a common definition," Optical Engineering 54, 105112 (2015), is used in this context: $P_{g,F}^{normal}(v_d)=0.6438-0.001682\,v_d$. Accordingly, the relative partial dispersion $P_{g,F}$ of a material is frequently described by the difference $\Delta P_{g,F}=P_{g,F}-P_{g,F}^{normal}$, which specifies the vertical distance of the relative partial dispersion of the material from the normal line (see also FIG. 1 in this respect).

By way of example, materials with anomalous relative partial dispersion are described in documents U.S. Pat. No. 8,934,183 B2, U.S. Pat. No. 6,912,092 B2, U.S. Pat. No. 7,158,320 B2, U.S. Pat. No. 8,773,783 B2, U.S. Pat. No. 7,193,789 B2, U.S. Pat. No. 7,136,237 B2 and U.S. Pat. No. 7,312,935 B2. Lenses with materials with anomalous relative partial dispersion are described in documents U.S. Pat. No. 7,158,320 B2, U.S. Pat. No. 8,773,783 B2, U.S. Pat. No. 7,193,789 B2 and U.S. Pat. No. 7,292,398 B1.

SUMMARY

Against the described background it is an object herein to provide an improved compact lens for a camera, which is suitable in particular for mobile devices, for example smartphones. Further objects consist of providing an advantageous camera and an advantageous mobile device.

The lens according to certain embodiments for a camera has a longitudinal axis, which extends perpendicular to an entrance plane that limits the physical extent of the lens and which may coincide with the optical axis, or an optical axis, of the lens, a focal length f and an installation length TL in the direction of the longitudinal axis, that is to say a depth, of less than 10 millimeters (TL<10 mm), for example less than 8 mm (TL<8 mm) and preferably less than 6.5 millimeters (TL<6.5 mm), and comprises a number of refractive optical elements, for example three to eight lens elements, and a stop which in the fully open state has a maximum diameter of $D_{stop}$. This stop limits the diameter of the light beam that is incident on the lens in a manner parallel to the optical axis to a certain value D. Should the stop be arranged in front of the first lens element of the lens or should the stop represent the lens element mount of the first lens element of the lens, then the stop diameter equals the diameter of the light beam incident in a manner parallel to the optical axis, and the following applies accordingly: $D_{stop}=D$. However, should the stop be attached between the first lens element of the lens and the image plane of the lens, the stop diameter $D_{stop}$ and the diameter D of the light beam parallel to the axis differ from one another. The focal length f of the lens ranges between 25 millimeters (25 mm) and 6 millimeters (6 mm) (25 mm≥f≥6 mm), preferably ranges between 10 millimeters (10 mm) and 6 millimeters (6 mm) (10 mm≥f≥6 mm), for example ranges between 10 mm and 8 mm, in particular ranges between 10 mm and 7 mm. The ratio of the focal length f to the maximum diameter of the stop D ranges between 1.4 and 8 (1.4≤f/D≤8), for example ranges between 2 and 4 (2≤f/D≤4). A small ratio of the focal length to the maximum stop diameter is advantageous in that a higher étendue and a smaller diffraction limit are obtained. The telephoto factor, that is to say the ratio of the installation length to the focal length (TL/f), is preferably less than 1 (TL/f<1), that is to say the lens is preferably configured as a telephoto lens.

There is at least one refractive optical element which comprises a material with an Abbe number $v_d$ and for which the absolute value of the difference $\Delta P_{g,F}=P_{g,F}-P_{g,F}^{normal}$ between relative partial dispersion $P_{g,F}$ of the material and a normal relative partial dispersion $P_{g,F}^{normal}$ at the Abbe number $v_d$ of the material is at least 0.05. Here, the normal relative partial dispersion is defined by $P_{g,F}^{normal}(v_d)= 0.6438-0.001682\ v_d$, that is to say by a straight line in a diagram that shows a dependence between the normal relative partial dispersion $P_{g,F}^{normal}$ and the Abbe number $v_d$. Preferably, the at least one refractive optical element consists of a material with anomalous relative partial dispersion. Expressed differently, the at least one refractive optical element comprises a material with anomalous relative partial dispersion and/or may in particular consist of such a material.

Within the scope of the present invention, optical materials with $\Delta P_{g,F}\geq|0.05|$ are understood to be materials with anomalous relative partial dispersion (anomalous partial dispersion materials—APDM). In an example preferred embodiment variant, the at least one refractive optical element comprises material for which the absolute value of the difference between the relative partial dispersion and the normal relative partial dispersion is at least 0.07 ($\Delta P_{g,F}\geq|0.07|$).

The lens according to certain embodiments is advantageous in that it offers a very compact and simultaneously powerful telephoto lens. In this case, the functionality of a telephoto lens is ensured, despite a short installation length. The lens is preferably designed for a camera for a portable mobile device, for example for a smartphone camera or for a camera for a tablet or a smart watch or a pair of smartglasses or a notebook or a netbook or a laptop. In this context, a telephoto lens for a smartphone camera, or a camera for any other portable mobile device can be realized in particular.

The at least one refractive optical element may consist of a material with anomalous relative partial dispersion (APDM). Compact telephoto lenses with a very good optical power can be realized by the use of, for example, one or two thin refractive layers which consist of APDM, for example. The ratio of the installation length TL to the focal length f is preferably less than 0.9 (TL/f<0.9), in particular less than 0.8 (TL/f<0.8).

The at least one refractive optical element may be applied as a layer, for example on a further optical element, or may be in the form of a film or an asphere, in particular a lens element, or an optical cement or a gradient index lens element (GRIN lens element) or as a gradient index fiber or as a microlens array or as a free-form element. Here, the at least one refractive optical element may preferably have a refractive power that differs from 0 diopters, with the refractive power being defined as the reciprocal of the focal length of the element, as known from the literature. It may also be arranged to be freestanding in the beam path. In particular, the refractive optical element comprising the APDM may be applied to a refractive lens element. It is likewise possible for the at least one refractive optical element to be configured as optical cement, that is to say to be used as an adhesive for connecting two adjacent optical elements.

The at least one refractive optical element preferably has a focal length, the absolute value of which is greater than the focal length of the lens by at least a factor of 10. Preferably, the at least one refractive optical element has a thickness, that is to say measured in the direction of the optical axis, of no more than 250 micrometers (250 µm), preferably of no more than 150 micrometers (150 µm). Expressed differently, the aforementioned values of the thickness are not exceeded at the thickest point of the optical element. Furthermore, the material of the at least one refractive optical element, that is to say the APDM, advantageously has an Abbe number that is less than 30, more particularly less than 20.

The lens may comprise between three and eight further refractive optical elements, for example refractive lens elements, in addition to the at least one refractive optical element which comprises APDM. Said further refractive optical elements may comprise polymers or consist of polymers. This also applies to the at least one refractive optical element which comprises APDM. This may also be applied, in the form of a thin layer, to another lens element or may be introduced between two lens elements. Alternatively, the at least one refractive optical element with anomalous relative partial dispersion may also be arranged freestanding in the beam path.

The APDM are preferably produced by introducing doping into a conventional polymer material. Here, doping can be implemented either using nanoparticles or using additional atoms, molecules or molecule groups [in this respect, see D. Werdehausen, S. Burger, I. Staude, T. Pertsch, and M. Decker, "Dispersion-engineered nanocomposites enable achromatic diffractive optical elements," Optica 6, 1031 (2019); D. Werdehausen, S. Burger, I. Staude, T. Pertsch, and M. Decker, "General design formalism for highly efficient flat optics for broadband applications," Optics Express 28, 6452 (2020); J.-g. Liu, and M. Ueda, "High refractive index polymers: fundamental research and practical applications," J. Mater. Chem. A 19, 8907-8919 (2009)].

If nanoparticles are used, these have a mean size of less than 20 nm and preferably less than 7 nm, 5 nm or 4 nm in order to avoid scattering losses [D. Werdehausen, I. Staude, S. Burger, J. Petschulat, T. Scharf, T. Pertsch, and M. Decker, "Design rules for customizable optical materials based on nanocomposites," Opt. Mater. Express 8, 3456 (2018); D. Werdehausen, X. G. Santiago, S. Burger, I. Staude, T. Pertsch, C. Rockstuhl, and M. Decker, "Modeling Optical Materials at the Single Scatterer Level: The Transition from Homogeneous to Heterogeneous Materials," Advanced Theory and Simulations n/a, 2000192 (2020).] Independently of the doping, the APDM in this case generally have an absorption edge in the vicinity of the visual spectral range, that is to say at a wavelength below 430 nm or above 700 nm.

In an example preferred configuration, in relation to the installation length of the lens and in the direction of an image side when starting from an object side, the at least one refractive optical element which comprises APDM is arranged in the first third of the lens. Alternatively, the at least one refractive optical element, that is to say the APDM, may be arranged in the second half of the lens. In a further variant, a first refractive optical element which comprises APDM may be arranged in the first third of the lens and a second refractive optical element which comprises APDM may be arranged in the second half of the lens. Long focal lengths can be achieved in this way.

Furthermore, the lens may have a field of view (FOV) over the full diagonal ranging between 45 degrees and 10 degrees (45°≥FOV≥10°). Here, the FOV denotes twice the maximum angle between the optical axis and the chief ray of a light beam.

The at least one refractive optical element which comprises APDM and/or at least one, preferably all, of the refractive optical elements may comprise a polymer or consist of a polymer. The use of polymers is advantageous in that the corresponding components firstly have a light and robust embodiment and secondly are cost-effectively producible in great numbers. By way of example, the following compositions may be used as polymers: polymethyl methacrylate (PMMA), cyclo olefin polymer (COP), cyclo olefin copolymer (COC; trade name ZEONEX), polycarbonate (PC), polystyrene (PS) and styrene acrylonitrile (SAN). It is also conceivable to produce one or more lens elements of the objective using additive manufacturing methods, for example using a 3-D printer to print optical components. It is possible also to produce the at least one refractive optical element which comprises the APDM material using such additive manufacturing methods. In this case, the refractive index of the at least one refractive optical element which comprises APDM may also be varied depending on the location within the element. Such an element is conventionally referred to as a gradient index lens element (GRIN lens element). In this case, an APDM may be used in particular only within a spatially restricted portion within an optical element. Expressed differently, it may also only be a spatially restricted portion of the at least one refractive optical element that is characterized by anomalous relative partial dispersion.

In an advantageous variant, the lens comprises between three and eight further refractive optical elements, that is to say refractive optical elements in the range of normal relative partial dispersion $P_{g,F}$, that is to say materials with $\Delta P_{g,F} \leq |0.05|$, in addition to the at least one refractive optical element which comprises APDM. By way of example, the refractive optical elements can be lens elements. By combining at least one refractive optical element with anomalous relative partial dispersion with no more than eight other lens elements, a particularly small, low weight lens with a comparatively simple structure is provided.

Documents U.S. Pat. No. 7,158,320 B2, U.S. Pat. No. 8,773,783 B2, U.S. Pat. No. 7,193,789 B2 and U.S. Pat. No. 7,292,398 B1 have already disclosed optical systems with APDM. However, these are designs which predominantly consist of purely spherical lens elements and for which total lengths TL>40 mm are provided. However, such design approaches are not suitable for powerful compact lenses with TL<8 mm and preferably TL<6.5 mm [T. Steinich, and V. Blahnik, "Optical design of camera optics for mobile phones", Advanced Optical Technologies 1 (2012)]. Moreover, the use of APDM has the considerable advantage over embodiments of similarly compact telephoto lenses with diffractive optical elements that, in contrast to diffractive optical elements, there is no stray light at unwanted orders of diffraction, which generally leads to a loss of contrast with double images, in the case of thin refractive lens elements consisting of APDM. Therefore, in respect of stray light, the image quality of the lenses according to the invention is superior to that of lenses with diffractive optical elements according to the prior art. In relation to compact telephoto lenses with a folded design, that is to say lenses in which there is a beam deflection by way of a mirror, as described in for example H. J. Brückner, V. Blahnik, and U. Teubner, "Maximale Bildqualität aus Minikameras" [Maximum image quality from miniature cameras], Physik in unserer Zeit 51, 236-243 (2020) and M. Kreitzer, and J. Moskovich, "Optical design of a smartphone zoom lens", Proc. SPIE 11106, Zoom Lenses VI, 111060D (9 Sep. 2019), the lenses according to the invention are advantageous in that such a deflection is unnecessary. This is advantageous since a deflection generally leads to a significant increase in complexity, a reduction in the manufacturing tolerances and an increase in the required installation space in the transverse direction. Moreover, the restricted size of the mirror required for the deflection causes an increase in the f-number f/D at longer focal lengths [H. J. Brückner, V. Blahnik, and U. Teubner, "Maximale Bildqualität aus Minikameras" [Maximum image quality from miniature cameras], Physik in unserer Zeit 51, 236-243 (2020)].

However, APDM may also be advantageously used in such folded designs. In a further configurational variant, the lens according to the invention comprises at least one optical component with a reflective design, for example a mirror or a prism. The lens may have a folded beam path in this variant. This facilitates further design options. By way of example, a total length of the beam path within the lens of up to 25 millimeters may be provided, that is to say a total length of the beam path that is significantly longer than the installation length of the lens may be provided by folding the beam path.

In a further variant, the lens according to certain embodiments may comprise at least one optical element designed to be diffractive and/or designed as a Fresnel element (e.g., a Fresnel lens element). This element may have a reflective and/or transmissive embodiment.

The at least one refractive optical element with anomalous relative partial dispersion may have a refractive index curve $n(\lambda)$ that depends on the wavelength $\lambda$ and that can be approximated by a function. The refractive index curve of an exemplary APDM can be described by the following function:

$$n(\lambda) = \sqrt{1 + \frac{1.21406\lambda^2}{\lambda^2 - 0.00489} + \frac{0.48463\lambda^2}{\lambda^2 - 0.04373} + \frac{2.98136\lambda^2}{\lambda^2 - 5.19483}}$$

However, in general, the refractive index curve of any APDM can be approximated by a similar function, for example with different coefficients.

As already mentioned above, a material with anomalous relative partial dispersion is generally produced by introducing doping into a conventional material, preferably of a polymer. Thus, materials with different refractive index curves n(λ) depending on the wavelength λ can easily be obtained by varying the concentration of the doping. Thin refractive optical elements or layers can be produced from all of these materials, and so lenses with corresponding APDM are producible.

The camera according to certain embodiments comprises an above-described lens. The mobile device according to certain embodiments comprises the aforementioned camera. Preferably, the mobile device is a portable cellular telephone, a smartphone, a tablet, a notebook, a netbook, a laptop, a smart watch, a PDA (personal digital assistant), a drone or a pair of smartglasses.

The camera according to certain embodiments and the mobile device according to certain embodiments, in particular the smartphone, have the same properties and advantages as the lens described above.

Certain embodiments may have any one or more of the following advantages: A compact telephoto lens for mobile devices, e.g., smartphones, is provided, in particular with a focal length that is greater than the installation length (f>TL), with the installation length being less than 10 mm. In this case, a ratio of the focal length f to the maximum diameter of the stop D of f/D≤8, preferably of f/D≤4, and a high imaging performance are achieved.

In comparison with embodiments with diffractive optical elements, the image quality of the purely refractive lens herein is not impaired by stray light from unwanted orders of diffraction. Moreover, a folded beam path is not necessary but only optional. The lens may be constructed, at least in part, from polymers, as a result of which it has a low weight and/or is cost-effectively producible in large numbers.

The invention is explained in greater detail below on the basis of exemplary embodiments and with reference to the accompanying figures. Although the invention is more specifically illustrated and described in detail by means of the preferred exemplary embodiments, nevertheless the invention is not restricted by the examples disclosed and other variations can be derived therefrom by the person skilled in the art, without departing from the scope of protection of the invention.

The figures are not necessarily accurate in every detail and to scale and can be presented in enlarged or reduced form for the purpose of better clarity. For this reason, functional details disclosed here should not be understood to be limiting, but merely to be an illustrative basis that gives guidance to a person skilled in this technical field for using the present invention in various ways.

The expression "and/or" used here, when it is used in a series of two or more elements, means that any of the elements listed can be used alone, or any combination of two or more of the elements listed can be used. For example, if a structure is described as containing the components A, B and/or C, the structure can contain A alone; B alone; C alone; A and B in combination; A and C in combination; B and C in combination; or A, B, and C in combination.

DETAILED DESCRIPTION

Figure 2:
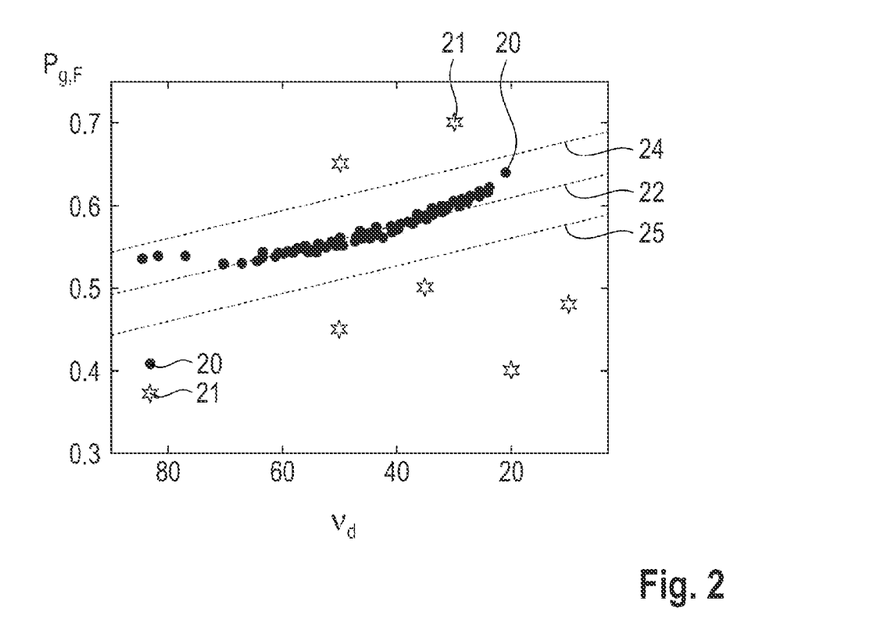
FIG. 2 schematically shows, in the form of a diagram, the dependence of the relative partial dispersion on the Abbe number for known optical glasses and materials with anomalous relative partial dispersion $P_{g,F}$.

FIGS. 1 and 2 each show diagrams in which the relative partial dispersion $P_{g,F}$ is plotted as a function of the Abbe number $v_d$. The circular dots 20 elucidate values for known optical glasses from the "Optical Glass 2018" glass catalog from Shott AG, cited above. The star-shaped points 21 elucidate values for materials with anomalous relative partial dispersion. The straight line 22 represents the connecting line that connects the values of the K7 and F2 type Schott glasses (see the Schott AG glass catalog, "Optical Glass 2018", cited above), that is to say the so-called normal line. In the illustration, the arrow 23 represents the vertical distance, that is to say the distance in the direction of the y-axis, of the relative partial dispersion of a material from the normal line 22 ($\Delta P_{g,F} = P_{g,F} - P_{g,F}^{normal}$). Within the scope of the present invention, APDM are defined as materials with a distance of at least 0.05 from the normal line. In FIG. 2, the regions above the straight line 24 running parallel to the normal line 22 and the regions below the straight line 25 likewise running parallel to the normal line 22 denote the corresponding regions in which materials have an anomalous relative partial dispersion.

Figure 3:
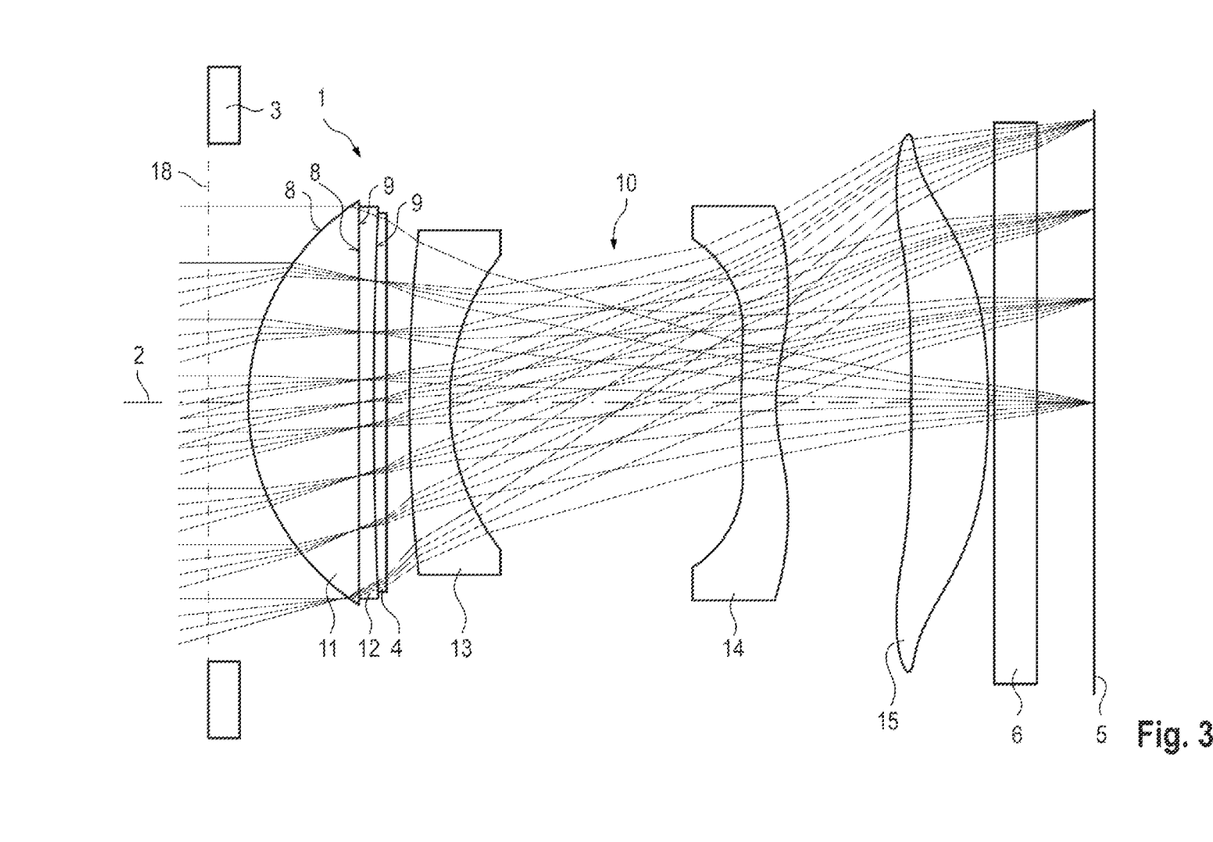
FIG. 3 schematically shows a first variant of a lens in accordance with certain embodiments of the invention.
Figure 4:
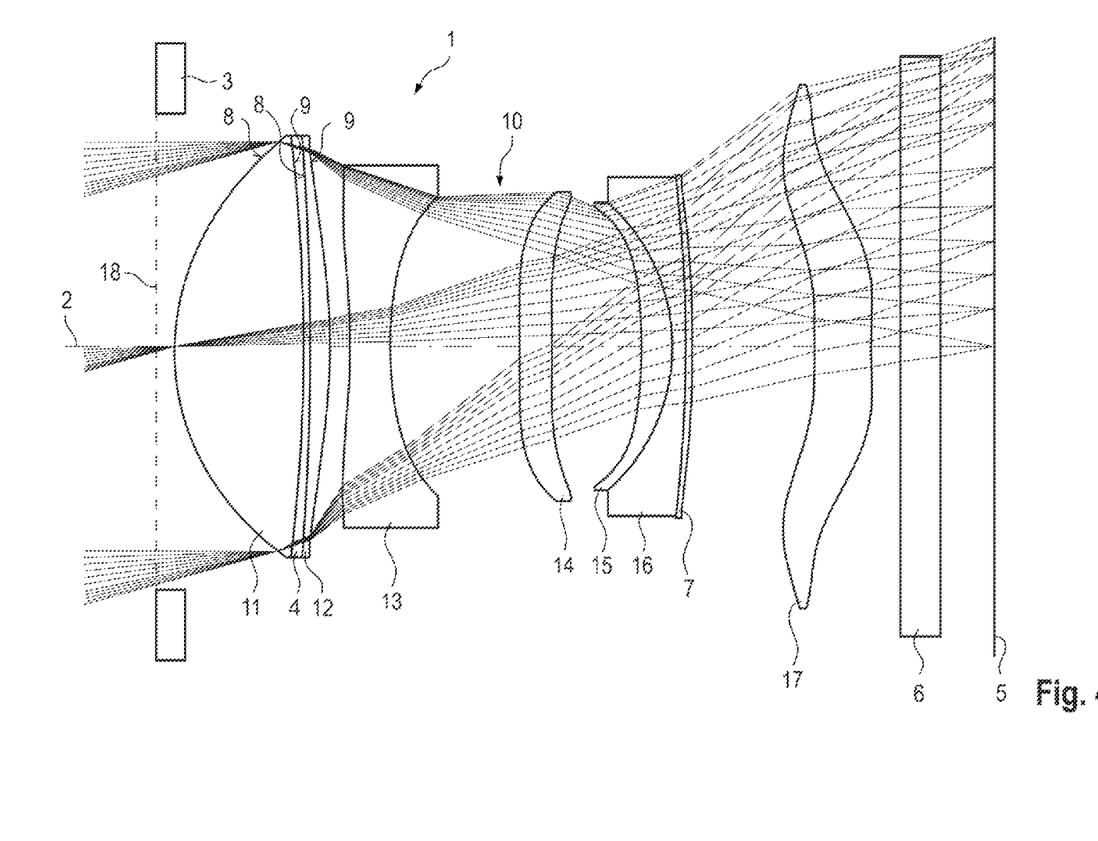
FIG. 4 schematically shows a second variant of a lens in accordance with certain embodiments of the invention.

Various exemplary embodiments of lenses 1 according to the invention are described below on the basis of FIGS. 3 and 4. In this case, the lenses in FIGS. 3 and 4 are shown true to scale in magnified fashion. Moreover, the beam path for different angles of incidence, that is to say field points, is shown and identified by reference sign 10 in all figures. The lenses shown in FIGS. 3 and 4 are each designed for the visible spectrum, that is to say for wavelengths between 400 nm and 700 nm. The refractive index curve of the utilized APDM can be described by the function specified above.

The lenses 10 shown each have a longitudinal axis 2, which coincides with the optical axis, a focal length f and an installation length TL along the longitudinal axis 2. The lenses 1 moreover comprise a stop 3, a number of refractive optical elements 11-17 in the form of aspheres, for example in the form of spherical or aspherical lens elements, and at least one refractive optical element 4, 7 with anomalous relative partial dispersion. Moreover, the lenses 1 shown comprise an image plane 5 and a plane parallel plate 6 that is arranged immediately upstream of the image plane 5 in the beam path in the direction from an object plane to the image plane 5. The refractive optical elements 11 to 17 each have a front side 8 pointing to the object plane or to the stop 3 and a back side 9 pointing to the image plane 5. In the variants shown, the boundary 3 defines an entrance plane 18 into the lens 1. The entrance plane may also be defined by another component which defines the entrance of a beam into the lens 1 and hence determines the physical extent of the lens. In particular, it may also extend through the vertex of the first lens and consequently correspond to the tangential plane of this point. The longitudinal axis 2 and the entrance plane 18 extend perpendicular to one another.

In the direction of the beam path from the object plane (not shown) to the image plane 5, the stop 3, a first asphere in the form of a convex lens element 11, a second asphere in the form of a concave lens element 12, a third asphere in the form of a convex-concave lens element 13 and two further aspheres 14 and 15 are arranged upstream of the plane parallel plate 6 and the image plane in the variant shown in FIG. 3. In FIG. 4, six refractive optical elements 11 to 17 are arranged upstream of the plane parallel plate 6 and the image plane 5. In principle, the refractive optical elements or the lens elements 11-17 can be of a convex, concave, spherical or aspherical form, or any form combined therefrom. Free-form lens elements or Fresnel lens elements may also be used. An asphere is understood to mean a lens element with a rotationally symmetric surface, the surface of which may have surface regions with radii of curvature that deviate from one another.

Additionally, a refractive optical element 4 with anomalous relative partial dispersion is arranged in the beam path in FIG. 3. In the embodiment variant shown, the refractive optical element with anomalous relative partial dispersion 4 is arranged on the back side 9 of the second lens element or asphere 12. In this case, the refractive optical element with anomalous relative partial dispersion 4 may be embodied as a thin layer which is securely connected to the refractive optical element 12. However, as a separate component, it may also be arranged adjacent to the refractive optical element 12. In FIG. 3, the refractive optical element with anomalous relative partial dispersion 4 is arranged in the first third of the lens in relation to the installation length of the lens 1 when proceeding from the stop 3 in the direction of the image plane 5.

In the embodiment variant shown in FIG. 4, a first refractive optical element with anomalous relative partial dispersion 4 and a second refractive optical element with anomalous relative partial dispersion 7 are present. In this case, when proceeding from the stop 3 in the direction of the image plane 5, the first refractive optical element with anomalous relative partial dispersion 4 is arranged in the first third of the lens 1 in relation to the installation length of the lens 1 and the second refractive optical element with anomalous relative partial dispersion 7 is arranged in the second half of the lens 1. The first refractive optical element with anomalous partial dispersion 4 is arranged between the first asphere 11 and the second asphere 12, for example securely connected to both aspheres 11 and 12 as an intermediate layer or film. The second refractive optical element with anomalous relative partial dispersion 7 is arranged on the back side 9 of the refractive optical element 16 in the embodiment variant shown in FIG. 4, for example securely connected to said refractive optical element as a layer or film, or as a component adjacent thereto.

The refractive optical elements with anomalous relative partial dispersion 4, 7 have a thickness of no more than 250 micrometers, preferably no more than 150 micrometers, and/or an Abbe number of less than 30, preferably less than 20.

The lens 1 shown in FIG. 3 has a focal length of 8 millimeters (f=8 mm), an installation length of 6 millimeters (TL=6 mm), a ratio of focal length to maximum stop diameter f/D of 2.8 (f/D=2.8) and a field of view of 31.4° (FOV=31.4°). The lens shown in FIG. 4 has a focal length of 8 mm (f=8 mm), an installation length of 6 millimeters (TL=6 mm), a ratio of focal length to maximum stop diameter of 2.5 (f/D=2.5) and a field of view of 31.4° (FOV=31.4°). As a matter of principle, refractive optical elements constructed from polymers can be used within the scope of the lens 1 according to the invention. A small ratio of focal length to stop diameter is advantageous in that a higher étendue and a smaller diffraction limit are obtained.

Figure 5:
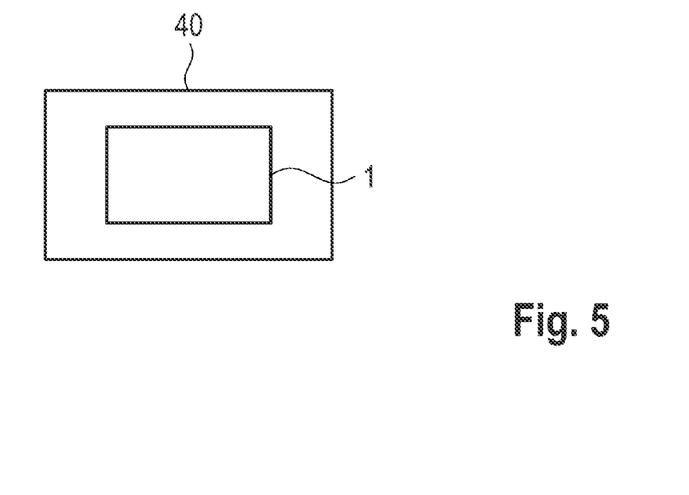
FIG. 5 schematically shows a camera in accordance with certain embodiments of the invention.

FIG. 5 schematically shows a camera 40 according to the invention, for example a camera for a mobile device, e.g., a smartphone, tablet, notebook, laptop, pair of smartglasses, smart watch, etc. The camera 40 comprises a lens 1 according to the invention, for example a lens described in conjunction with FIGS. 3 and 4.

Figure 6:
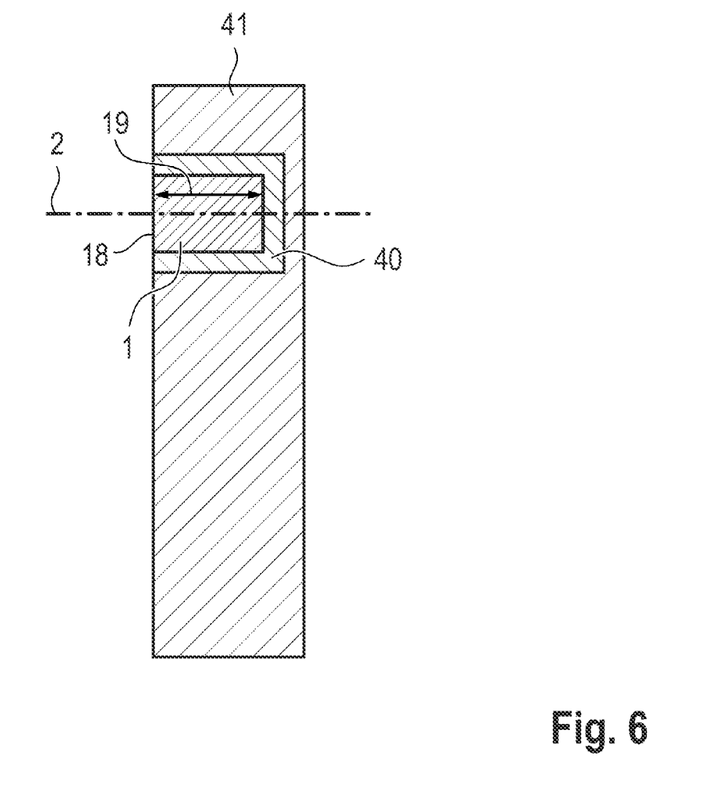
FIG. 6 schematically shows a mobile device in accordance with certain embodiments of the invention in a view in a longitudinal section.

FIG. 6 schematically shows, in a view in a longitudinal section, a mobile device 41, which may be for example a smartphone, a smart watch, a tablet, a notebook, a netbook, a laptop or a pair of smartglasses. The mobile device 41 comprises a camera 40 according to the invention. The lens 1 preferably has an installation length TL of 6.5 millimeters. The installation length is identified in FIG. 6 by an arrow with the reference sign 19.

LIST OF REFERENCE SIGNS

1 Lens
2 Longitudinal axis/optical axis
3 Boundary
4 Refractive optical element with anomalous relative partial dispersion
5 Image plane
6 Plane parallel plate
7 Refractive optical element with anomalous relative partial dispersion
8 Front side
9 Back side
10 Beam path
11 Refractive optical element
12 Refractive optical element
13 Refractive optical element
14 Refractive optical element
15 Refractive optical element
16 Refractive optical element
17 Refractive optical element
18 Entrance plane
19 Installation length
20 Measurement values for conventional optical glasses
21 Measurement values for materials with anomalous relative partial dispersion
22 Normal line
23 $\Delta P_{g,F}$, distance parallel to the y-axis
24 Straight line running parallel to the normal line
25 Straight line running parallel to the normal line
40 Camera
41 Mobile device

What is claimed is:

1. A lens for a camera, the camera comprising a longitudinal axis, a focal length and an installation length in the direction of the longitudinal axis of less than 10 millimeters (mm), the lens comprising:
a plurality of refractive optical elements; and
a stop with a maximum diameter,
wherein the focal length of the lens is in the range of 25 mm to 6 mm,
wherein a ratio of focal length to the maximum diameter of the stop is in the range of 1.4 to 8,
wherein at least one of the plurality of refractive optical elements comprises a material with an Abbe number $v_d$ and for which the absolute value of the difference $\Delta P_{g,F} = |P_{g,F} - P_{g,F}^{normal}|$ between relative partial dispersion $P_{g,F}$ of the material and a normal relative partial dispersion $P_{g,F}^{normal}$ at the Abbe number $v_d$ of the material is at least 0.05, and wherein the normal relative partial dispersion $P_{g,F}^{normal}$ is defined by $$P_{g,F}^{normal}(v_d) = 0.6438 - 0.001682\, v_d.$$

2. The lens of claim 1, wherein the at least one of the plurality of refractive optical elements comprises a material for which the absolute value of the difference between the relative partial dispersion and the normal relative partial dispersion is at least 0.07.

3. The lens of claim 1, wherein the at least one of the plurality of refractive optical elements is formed as a layer or film or asphere or optical cement or gradient index lens element or gradient index fiber or microlens array and/or is arranged to be freestanding in a beam path.

4. The lens of claim 1, wherein the at least one of the plurality of refractive optical elements has a focal length, the absolute value of which is at least 10 times greater than the focal length of the lens.

5. The lens of claim 1, wherein the at least one of the plurality of refractive optical elements has a thickness of no more than 250 micrometers.

6. The lens of claim 1, wherein the at least one of the plurality of refractive optical elements has an Abbe number $v_d$ of less than 30.

7. The lens of claim 1, wherein the lens comprises three to eight refractive optical elements in addition to the at least one of the plurality of refractive optical elements.

8. The lens of claim 1, wherein in relation to the installation length of the lens and in the direction of an image side when starting from an object side, the at least one of the plurality of refractive optical elements is arranged in the first third of the lens and/or the at least one of the plurality of refractive optical elements is arranged in the second half of the lens.

9. The lens of claim 1, wherein the ratio of installation length to focal length is less than 0.9.

10. The lens of claim 1, wherein the lens has an installation length in the direction of an optical axis of less than 6.5 mm.

11. The lens of claim 1, wherein the lens has a field of view in a range of 45 degrees to 10 degrees.

12. The lens of claim 1, further comprising at least one reflective or diffractive optical component.

13. A camera comprising a longitudinal axis, a focal length and an installation length in the direction of the longitudinal axis of less than 10 millimeters (mm), and a lens, wherein the lens comprises:
    a plurality of refractive optical elements; and
    a stop with a maximum diameter,
    wherein the focal length of the lens is in the range of 25 mm to 6 mm,
    wherein a ratio of focal length to the maximum diameter of the stop is in the range of 1.4 to 8,
    wherein at least one of the plurality of refractive optical elements comprises a material with an Abbe number vd and for which the absolute value of the difference $\Delta P_{g,F}=|P_{g,F}-P_{g,F}^{normal}|$ between relative partial dispersion $P_{g,F}$ of the material and a normal relative partial dispersion $P_{g,F}^{normal}$ at the Abbe number $v_d$ of the material is at least 0.05, and
    wherein the normal relative partial dispersion $P_{g,F}^{normal}$ is defined by $P_{g,F}^{normal}(v_d)=0.6438-0.001682\, v_d$.

14. A mobile device, comprising a longitudinal axis, a focal length and an installation length in the direction of the longitudinal axis of less than 10 millimeters (mm), and a lens, wherein the lens comprises:
    a plurality of refractive optical elements; and
    a stop with a maximum diameter,
    wherein the focal length of the lens is in the range of 25 mm to 6 mm,
    wherein a ratio of focal length to the maximum diameter of the stop is in the range of 1.4 to 8,
    wherein at least one of the plurality of refractive optical elements comprises a material with an Abbe number vd and for which the absolute value of the difference $\Delta P_{g,F}=|P_{g,F}-P_{g,F}^{normal}|$ between relative partial dispersion $P_{g,F}$ of the material and a normal relative partial dispersion $P_{g,F}^{normal}$ at the Abbe number $v_d$ of the material is at least 0.05, and
    wherein the normal relative partial dispersion $P_{g,F}^{normal}$ is defined by $P_{g,F}^{normal}(v_d)=0.6438-0.001682\, v_d$.

15. The mobile device of claim 14, wherein the mobile device is a portable cellular telephone or a smartphone or a tablet or a smart watch or a pair of smartglasses or a notebook or a netbook or a laptop or a personal digital assistant or a drone.

* * * * *